United States Patent
Katsuyama et al.

(10) Patent No.: US 11,423,479 B2
(45) Date of Patent: *Aug. 23, 2022

(54) DYNAMIC PEG ORDERS IN AN ELECTRONIC TRADING SYSTEM

(71) Applicant: IEX Group, Inc., New York, NY (US)

(72) Inventors: Bradley Toshio Katsuyama, New York, NY (US); Matthew Norbert Trudeau, Brooklyn, NY (US); Constantine Sokoloff, Jersey City, NJ (US); Benjamin Aaron Small, New York, NY (US); Robert Park, New York, NY (US); Daniel Aisen, New York, NY (US); Adrian Branko Facini, Brooklyn, NY (US); Donald Bollerman, Yonkers, NY (US); Francis Chung, New York, NY (US)

(73) Assignee: IEX Group, Inc., New York, NY (US)

( * ) Notice: Subject to any disclaimer, the term of this patent is extended or adjusted under 35 U.S.C. 154(b) by 796 days.

This patent is subject to a terminal disclaimer.

(21) Appl. No.: 16/170,589

(22) Filed: Oct. 25, 2018

(65) Prior Publication Data
US 2019/0066211 A1  Feb. 28, 2019

Related U.S. Application Data

(63) Continuation of application No. 14/799,975, filed on Jul. 15, 2015, now Pat. No. 10,185,993.
(Continued)

(51) Int. Cl.
*G06Q 40/04* (2012.01)

(52) U.S. Cl.
CPC .................... *G06Q 40/04* (2013.01)

(58) Field of Classification Search
CPC ........................................ G06Q 40/04
(Continued)

(56) References Cited

U.S. PATENT DOCUMENTS

| 4,736,294 A | 4/1988 | Gill et al. |
| 8,301,547 B2 | 10/2012 | Sulavka |

(Continued)

FOREIGN PATENT DOCUMENTS

| AU | 2010330629 A1 | 2/2012 |
| AU | 2016200212 A1 | 2/2016 |

(Continued)

OTHER PUBLICATIONS

International Search Report, PCT/US2015/040540, International Filing Date Jul. 15, 2015.
(Continued)

*Primary Examiner* — Jessica Lemieux
(74) *Attorney, Agent, or Firm* — Goodwin Procter LLP

(57) ABSTRACT

In order to protect a trading party from predatory trading strategies employed by some market participants, especially during certain periods when quotes for a particular security are experiencing rapid changes or transitions, embodiments of the present invention facilitate and support a new type of trading orders whose booking and execution behaviors are dynamically varied in response to environmental market conditions. Pursuant to predefined rules for the new type of trading orders, the orders may be allowed to trade at more aggressive price levels if the market is relatively stable, and the orders can only trade at less aggressive price levels when the market is unstable.

22 Claims, 7 Drawing Sheets

Related U.S. Application Data

(60) Provisional application No. 62/040,493, filed on Aug. 22, 2014.

(58) Field of Classification Search
USPC .......................................................... 705/37
See application file for complete search history.

(56) References Cited

U.S. PATENT DOCUMENTS

| | | | |
|---|---|---|---|
| 8,484,121 B2* | 7/2013 | Balabon | G06Q 40/00 |
| | | | 705/37 |
| 8,489,747 B2 | 7/2013 | Aisen et al. | |
| 8,589,260 B2 | 11/2013 | Chambers et al. | |
| 8,984,137 B2 | 3/2015 | Aisen et al. | |
| 9,082,119 B2 | 7/2015 | Ortiz et al. | |
| 9,774,401 B1* | 9/2017 | Borrill | H04L 9/0852 |
| 9,922,436 B2 | 3/2018 | Iannaccone et al. | |
| 9,928,548 B2 | 3/2018 | Schmidt et al. | |
| 9,940,670 B2 | 4/2018 | Aisen et al. | |
| 9,959,572 B2 | 5/2018 | Iannaccone et al. | |
| 10,127,612 B2 | 11/2018 | Mannix | |
| 10,185,993 B2 | 1/2019 | Katsuyama et al. | |
| 2004/0210511 A1* | 10/2004 | Waelbroeck | G06Q 40/04 |
| | | | 705/37 |
| 2007/0198397 A1 | 8/2007 | McGinley et al. | |
| 2010/0100500 A1 | 4/2010 | Nunes et al. | |
| 2010/0274736 A1* | 10/2010 | Hodjat | G06Q 40/04 |
| | | | 705/36 R |
| 2010/0332650 A1 | 12/2010 | Aisen et al. | |
| 2012/0166327 A1* | 6/2012 | Amicangioli | H04L 12/56 |
| | | | 705/37 |
| 2012/0191589 A1 | 7/2012 | Bok et al. | |
| 2012/0219283 A1 | 8/2012 | Sokolowski | |
| 2014/0019323 A1 | 1/2014 | Blake | |
| 2014/0279552 A1 | 9/2014 | Ortiz et al. | |
| 2015/0235212 A1 | 8/2015 | Ortiz et al. | |
| 2016/0019536 A1 | 1/2016 | Ortiz et al. | |
| 2016/0035027 A1 | 2/2016 | Mercer | |
| 2016/0104155 A1 | 4/2016 | McGaugh et al. | |
| 2016/0173364 A1 | 6/2016 | Pitio et al. | |
| 2016/0182330 A1 | 6/2016 | Iannaccone et al. | |
| 2016/0189260 A1 | 6/2016 | Nagla | |
| 2016/0205174 A1 | 7/2016 | Pitio et al. | |
| 2016/0210626 A1 | 7/2016 | Ortiz et al. | |
| 2016/0260173 A1 | 9/2016 | Aisen et al. | |
| 2016/0267082 A1 | 9/2016 | Wong et al. | |
| 2016/0277348 A1 | 9/2016 | Pitio | |
| 2017/0017958 A1 | 1/2017 | Scott et al. | |
| 2017/0039648 A1 | 2/2017 | Aisen et al. | |
| 2017/0097973 A1 | 4/2017 | Iannaccone et al. | |
| 2017/0124494 A1 | 5/2017 | Hristoskov et al. | |
| 2017/0161735 A1 | 6/2017 | Ortiz et al. | |
| 2017/0186085 A1 | 6/2017 | Nagla | |
| 2017/0249622 A1 | 8/2017 | Ortiz et al. | |
| 2017/0279736 A1 | 9/2017 | Pitio et al. | |
| 2017/0330181 A1 | 11/2017 | Ortiz | |
| 2018/0018723 A1 | 1/2018 | Nagla et al. | |
| 2018/0047065 A1 | 2/2018 | Wildberger | |
| 2018/0054363 A1 | 2/2018 | Ngampornsukswadi et al. | |
| 2018/0075527 A1 | 3/2018 | Nagla et al. | |
| 2018/0082678 A1 | 3/2018 | Olmstead et al. | |
| 2018/0158143 A1 | 6/2018 | Schmitt et al. | |
| 2019/0087898 A1 | 3/2019 | Mannix | |

FOREIGN PATENT DOCUMENTS

| | | |
|---|---|---|
| AU | 2016231624 A1 | 10/2016 |
| AU | 2015327722 A1 | 4/2017 |
| AU | 2015330644 A1 | 4/2017 |
| AU | 2016208989 A1 | 8/2017 |
| AU | 2016224908 A1 | 9/2017 |
| AU | 2016287789 A1 | 2/2018 |
| BR | 112012013891 A2 | 5/2016 |
| CA | 2707196 A1 | 1/2011 |
| CA | 2927532 A1 | 1/2011 |
| CA | 2927607 A1 | 1/2011 |
| CA | 2681251 A1 | 3/2011 |
| CA | 2706252 A1 | 3/2011 |
| CA | 2777438 A1 | 11/2012 |
| CA | 2830260 A1 | 4/2014 |
| CA | 2844318 A1 | 9/2014 |
| CA | 2961916 A1 | 4/2016 |
| CA | 2963287 A1 | 4/2016 |
| CA | 2913700 A1 | 6/2016 |
| CA | 2916284 A1 | 6/2016 |
| CA | 2970743 A1 | 6/2016 |
| CA | 2974151 A1 | 7/2016 |
| CA | 2922072 A1 | 8/2016 |
| CA | 2978488 A1 | 9/2016 |
| CA | 2980196 A1 | 9/2016 |
| CA | 2991073 A1 | 1/2017 |
| CA | 2910754 A1 | 4/2017 |
| CA | 3000464 A1 | 4/2017 |
| CA | 3000466 A1 | 4/2017 |
| CA | 2952874 A1 | 6/2017 |
| CA | 2970686 A1 | 12/2017 |
| CA | 2976505 A1 | 2/2018 |
| CA | 2976618 A1 | 2/2018 |
| CA | 2963767 A1 | 3/2018 |
| CN | 105978756 A | 9/2016 |
| CN | 107004190 A | 8/2017 |
| CN | 107004195 A | 8/2017 |
| CN | 107408253 A | 11/2017 |
| EP | 1777655 A1 | 4/2007 |
| EP | 2510451 A1 | 10/2012 |
| EP | 3201856 A1 | 8/2017 |
| EP | 3234792 A1 | 10/2017 |
| EP | 3248159 A1 | 11/2017 |
| EP | 3260979 A1 | 12/2017 |
| EP | 3269090 A1 | 1/2018 |
| EP | 3272082 A1 | 1/2018 |
| EP | 3317833 A1 | 5/2018 |
| KR | 10-2002-0012538 | 2/2002 |
| KR | 10-2012-0092880 A | 8/2012 |
| KR | 10-2012-0101535 A | 9/2012 |
| KR | 10-2012-0102644 A | 9/2012 |
| KR | 20180026498 A | 3/2018 |
| MX | 2012006659 A | 1/2013 |
| MX | 2017011021 A | 1/2018 |
| SG | 10201704581 | 7/2017 |
| SG | 11201707004 | 9/2017 |
| WO | WO-200050974 A2 | 8/2000 |
| WO | WO-2011/069234 A1 | 6/2011 |
| WO | WO-2014-043420 A1 | 3/2014 |
| WO | WO-2016/049745 A1 | 4/2016 |
| WO | WO-2016/054727 A1 | 4/2016 |
| WO | WO-2016/095012 A1 | 6/2016 |
| WO | WO-2016/115620 A1 | 7/2016 |
| WO | WO-2016/135705 A1 | 9/2016 |
| WO | WO-2016/141491 A1 | 9/2016 |
| WO | WO-2016/149807 A1 | 9/2016 |
| WO | WO-2017/000061 A1 | 1/2017 |
| WO | WO-2017/054094 A1 | 4/2017 |
| WO | WO-2017/054095 A1 | 4/2017 |
| WO | WO-2017/136956 A1 | 8/2017 |
| WO | WO-2017/143435 A1 | 8/2017 |
| WO | WO-2017/152265 A1 | 9/2017 |
| WO | WO-2018/010009 A1 | 1/2018 |
| WO | WO-2018/014123 A1 | 1/2018 |
| WO | WO-2018/049523 A1 | 3/2018 |
| ZA | 2012/05093 B | 2/2014 |

OTHER PUBLICATIONS

International Search Report and Written Opinion dated Oct. 13, 2015.

Application for Recognition of Aequitas Neo Exchange Inc. (Aequitas Neo Exchange) and its parent company, Aequitas Innovations Inc. (Aequitas), of Notice and Request for Comment, 41 Pages, Jun. 27, 2014, Ontario Securities Commission,https://www.osc.gov.on.ca/documents/en/Marketplaces/xxr-aequitas_20140627_nrfc-application2.pdf.

(56) References Cited

OTHER PUBLICATIONS

Greg Klein, HFT speed bump gets green light as OSC approves Aequitas Neo Exchange, 2 Pages, Nov. 17, 2014, Resource Clips http://resourceclips.com/2014/11/17/hft-speed-bump-gets-green-light-as-os- c-approves-aequitas-neo-exchange/.
Innovative Design to Promote Liquidity Formation, 2 Pages, Apr. 5, 2015, Aequitas Neo Exchange Web Site, https://web.archive.org/web/20150405131256/https://www.aequitasneoexchang-e.com/en/trading/trading-solutions/neo-book/.
Joe Castaldo, How Aequitas plans to build a kinder, gentler stock market, 12 Pages, Mar. 26, 2015, Canadian Business, http://www.canadianbusiness.com/innovation/aequitas-vs-hft/.
TMX Group to Streamline its Equities Trading Offering, 2 Pages, Oct. 23, 2014, TMX Press Release, https://www.tmx.com/newsroom/press-releases?id=203&year=2014&month=10.
Sanmay Das, A Learning Market-Maker in the Glosten-Milgrom Model, 24 Pages, Apr. 2005, Quantitative Finance, vol. 5, Issue 2, http://www.cse.wustl.edu/.about.sanmay/papers/das-qf-rev3.pdf.
Michael G. Sotiropoulos, Development and Usage of Short Term Signals in Order Execution, 33 Pages, Oct. 10, 2012, Algorithmic Trading Quantitative Research, Cornell Financial Engineering Seminar,https://www.orie.cornell.edu/engineering2/customcf/iws_events_calendar/fi-les/shorttermsignaldevusage-soti ropoulos.pdf.
Order Attributes, 11 pages, Jun. 22, 2015, Nasdaq Rule 4703, Nasdaq Stock Market, http://nasdaq.cchwallstreet.com/NASDAQTools/PlatformViewer.asp?se-lectednode=chp_1_1_4_1&manual=%2Fnasdaq%2Fmain%2Fnasdaq-equityrules%2F.
Notice of Filing of Amendment No. 1, and Order Granting Accelerated Approval of a Proposed Rule Change, as Modified by Amendment No. 1, to Add a New Discretionary Pegged Order, 16 pages, Jun. 28, 2016, U.S. Securities and Exchange Commission, FileNo. SR-NYSEArca-2016-44, Release No. 34-78181, https://www.sec.gov/rules/sro/nysearca/2016/34-78181.pdf.
Notice of Filing of Proposed Rule Change to Modify Exchange Rule 3307 to Institute a Five Millisecond Delay in the Execution Time of Marketable Orders on Nasdaq OMX PSX, 12 pages, Aug. 17, 2012, U.S. Securities and Exchange Commission, File No. SR-Phlx-2012-106, Release No. 34-67680, https://www.sec.gov/rules/sro/phlx/2012/34-67680.pdf.
Dan Marcus, Market structure evolution, 6 pages, Mar. 13, 2015, ParFx press release, https://www.parfx.com/news/press-releases/market-structure-evolution-by-d- an-marcus-ceo-parfx/.
About ParFx, 2 pages, Sep. 11, 2013, ParFx Web Site, https://web.archive.org/web/20130911210916/http://www.parfx.com/about-par- fx.
Ivy Schmerken, PDQ ATS Launches a New Electronic Equity Auction for Large Orders, 4 pages, Sep. 22, 2014, InformationWeek WallStreet & Technology, http://www.pdqats.com/pdq-ats-launches-a-new-electronic-equity-auction-fo- r-large-orders/.
Ivy Schmerken, EBSs Plan to Slow Down HFT in FX Could Influence Other Regulators, 2 pages, Apr. 29, 2013, InformationWeek WallStreet & Technology, http://www.wallstreetandtech.com/exchanges/ebss-plan-to-slow-down-hft-in--fx-could-influence-other-regulators/a/d-id/1268077.
Schematic (Auction Process)/PDQ ATS, 1 page, Sep. 30, 2015, PDQ Web Site, https://web.archive.org/web/20150930073841/http://www.pdqats.com/platform- /process/.
Ivy Schmerken, PDQ ATS Launches a New Electronic Equity Auction for Large Orders, 1-4 pages, Sep. 22, 2014, InformationWeek WallStreet & Technology, http://www.pdqats.com/pdq-ats-launches-a-new-electronic-equity-auction-fo- r-large-orders/.
"Dan Marcus, Market structure evolution", 1-6 pages, Mar. 13, 2015, ParFx press release, https://www.parfx.com/news/press-releases/market-structure-evolution-by-d- an-marcus-ceo-parfx/.
Notice of Filing of Proposed Rule Change to Modify Exchange Rule 3307 to Institute a Five About ParFx, 1-2 pages, Sep. 11, 2013, ParFx Web Site, https://web.archive.org/web/20130911210916/http://www.parfx.com/about-par- fx.
Joe Castaldo, How Aequitas plans to build a kinder, gentler stock market, 1-12 pages, Mar. 26, 2015, Canadian Business http://www.canadianbusiness.com/innovation/aequitas-vs-hft/.
Greg Klein, HFT speed bump gets green light as OSC approves Aequitas Neo Exchange, 1-2 pages, Nov. 17, 2014, Resource Clips http://resourceclips.com/2014/11/17/hft-speed-bump-gets-green-light-as-os- c-approves-aequitas-neo-exchange/.
Ivy Schmerken, EBSs Plan to Slow Down HFT in FX Could Influence Other Regulators, 1-2 pages, Apr. 29, 2013, InformationWeek WallStreet & Technology, http://www.wallstreetandtech.com/exchanges/ebss-plan-to-slow-down-hft-in--fx-could-influence-other-regulators/a/d-id/1268077.
Application for Recognition of Aequitas Neo Exchange Inc. (Aequitas Neo Exchange) and its parent company, Aequitas Innovations Inc. (Aequitas), of Notice and Request for Comment, 1-41 pages, Jun. 27, 2014, Ontario Securities Commission,https://www.osc.gov.on.ca/documents/en/Marketplaces/xxr-aequitas_20140627- nrfc-application2.pdf.
Innovative Design to Promote Liquidity Formation, 1-2 pages, Apr. 5, 2015, Aequitas Neo Exchange Web Site, https://web.archive.org/web/20150405131256/https://www.aequitasneoexchang-e.com/en/trading/trading-solutions/neo-book/.
TMX Group to Streamline its Equities Trading Offering, 1-2 pages, Oct. 23, 2014, TMX Press Release, https://www.tmx.com/newsroom/press-releases?id=203&year=2014&month=10.
Third-party Submission Under 37CFR 1.290 for U.S. Appl. No. 14/688,463, filed Apr. 22, 2016, (18 pages).
Third-party Submission Under 37CFR 1.290 for U.S. Appl. No. 14/688,463, filed Apr. 22, 2016, (13 pages).
"Chicago Fed Warned on High-Frequency Trading, SEC Slow to Respond," *Reuters Hedgeworld*, New York, NY. (Oct. 1, 2012), https://search.proquest.com/docview/1081511083?accountid=14753, (4 pages).
"New Trading Platform to Tackle HFT," *Compliance Reporter*, London, UK (Jul. 29, 2013), https://search.proquest.com/docview/1430519512?accountid=14753, (3 pages).
"Upstart Trading Platform Pitches itself as a Sanctum," *Dow Jones Institutional News*, New York, NY. Jul. 29, 2013, https://searchproquest.com/docview/2092612293?accountid=14753. (3 pages).

\* cited by examiner

FIG. 1A

Example 1A. Buy DPO with Limit Price Same as NBBO Midpoint

| (Unit: cents) | Bid | Midpoint | Offer |
|---|---|---|---|
| NBBO | 10 | 12 | 14 |
| Buy DPO @12 | Booked @10 | | |
| | Recheck up to 12 | | |

FIG. 1B

Example 1B. Sell DPO with Limit Price Same as NBBO Midpoint

| (Unit: cents) | Bid | Midpoint | Offer |
|---|---|---|---|
| NBBO | 10 | 12 | 14 |
| Sell DPO @12 | | | Booked @14 |
| | | | Recheck down to 12 |

FIG. 2

Example 2. DPOs with Limit Less Aggressive than NBBO Midpoint

| (Unit: cents) | Bid | Midpoint | Offer |
|---|---|---|---|
| NBBO | 10 | 12 | 14 |
| Buy DPO @11 | Booked @10 | | |
| | Recheck up to 11 | | |
| Sell DPO @13 | | | Booked @14 |
| | | | Recheck down to 13 |

FIG. 2A

Example 2A. After NBO Drops

| (Unit: cents) | Bid | Midpoint | Offer |
|---|---|---|---|
| NBBO | 10 | 11←12 | 12←14 |
| Buy DPO @11 | Booked @10 | | |
| | Recheck up to 11 | | |
| Sell DPO @13 | | | Booked @13 |
| | | | Recheck to 13 |

FIG. 2B

Example 2B. After NBO Rises

| (Unit: cents) | Bid | Midpoint | Offer |
|---|---|---|---|
| NBBO | 10→12 | 12→13 | 14 |
| Buy DPO @11 | Booked @11 | | |
| | Recheck to 11 | | |
| Sell DPO @13 | | | Booked @14 |
| | | | Recheck to 13 |

FIG. 3

Example 3. DPOs with Limit More Aggressive than NBBO Midpoint

| (Unit: cents) | Bid | Midpoint | Offer |
|---|---|---|---|
| NBBO | 10 | 12 | 14 |
| Buy DPO @13 | Booked @10 | | |
| | Recheck up to 12 | | |
| Sell DPO @11 | | | Booked @14 |
| | | | Recheck down to 12 |

FIG. 4

Example 4. (For Comparison) Midpoint Peg Orders (MPOs)

| (Unit: cents) | Bid | Midpoint | Offer |
|---|---|---|---|
| NBBO | 10 | 12 | 14 |
| Buy MPO @13 | | Booked @12 | |
| A Sell Order comes in @13 | | | Booked @12 |
| | | | (Executed w/ MPO @12) |
| Sell MPO @10 | | Booked @12 | |
| A Buy Order comes in @12 | (Executed w/ MPO @12) | | |

FIG. 5A

Example 5A. No Restriction during Quote Instability

| (Unit: cents) | Bid | Midpoint | Offer |
|---|---|---|---|
| Markets 1/2/3 | 10 | 12→12.5 | 14→15 |
| Markets 4/5 | 10 | 12 | 14 |
| Non-DPOs | *Buy orders @12 could be executed by Markets 4/5 @12* | | |

FIG. 5B

Example 5B. Restriction on DPO Execution during Quote Transition

| (Unit: cents) | Bid | Midpoint | Offer |
|---|---|---|---|
| Markets 1/2/3 | 10 | 12→12.5 | 14→15 |
| Markets 4/5 | 10 | 12 | 14 |
| DPOs | *DPOs can only be executed at NBB/NBO during quote transition* | | |

DYNAMIC PEG ORDERS IN AN ELECTRONIC TRADING SYSTEM

CROSS-REFERENCE TO RELATED APPLICATIONS

The present application is a continuation of U.S. Utility application Ser. No. 14/799,975, filed Jul. 15, 2015, which claims the benefits and priority of U.S. Provisional Application No. 62/040,493, filed Aug. 22, 2014. The present application is also related to PCT International Application No. PCT/US13/59558, filed Sep. 12, 2013, titled "TRANSMISSION LATENCY LEVELING APPARATUSES, METHODS AND SYSTEMS," which in turn claimed priority to U.S. Provisional Application Nos. 61/700,094 (filed Sep. 12, 2012), 61/753,857 (filed Jan. 17, 2013), 61/758,508 (filed Jan. 30, 2013), and 61/876,200 (filed Sep. 11, 2013). All of the above-referenced patent applications are incorporated herein by reference in their entireties.

FIELD OF THE INVENTION

The present invention disclosed herein relates generally to apparatuses, methods, and systems for electronic trading and/or auction. More particularly, the present invention relates to apparatuses, methods and systems for order book management and trade execution with respect to dynamic peg orders and other electronic trading techniques.

BACKGROUND OF THE INVENTION

In the prior, related applications, such as PCT International Application No. PCT/US13/59558, Applicant disclosed various innovations related to electronic trading and computer-implemented platforms/infrastructure to facilitate improvements in electronic trading. One goal of such innovations is to reduce or deter predatory trading behavior so as to maintain a fair marketplace for all participants big or small. In particular, it is one object of those innovations and the present invention to minimize or eliminate information leakage and the use of the same in unfair trading strategies such as order book arbitrage or latency arbitrage.

For example, as previously explained, in the U.S. there is no such thing as a single national security exchange in a single location—instead, a number of security exchanges exist and operate at different locations. Since numerous trades are executed at some or all of these exchanges at any given moment and it takes time for market data updates to propagate among the exchanges, the order books of all the exchanges cannot be perfectly synchronized and updated at all times. High-speed traders can take advantage of quote instabilities, when momentary discrepancies exist among order books of different exchanges for the same security, to conduct trades at stale price points and therefore reap benefits to the disadvantage of other market participants. Furthermore, these momentary discrepancies can be anticipated before they actually occur by, for example, receiving and processing real-time low-latency market data feeds that permit a high-speed market participant to understand developing conditions that typically precede, or are characteristic, of quote instability.

For another example, the conventional approaches by which order books are managed could also lead to information leakage. High-speed traders can use a number of tactics such as small orders or non-firm orders (e.g., "indications of interest," "discretionary orders," "negotiable orders," "non-firm quotations," or "immediate-or-cancel orders") to probe the order books of the exchanges. Once a trade confirmation or other feedback from an exchange indicates the existence of a large, hidden or non-displayed order, the high-speed traders could place additional trades to take advantage of such order.

Other problems may also exist with existing electronic trading systems.

SUMMARY OF THE INVENTION

Embodiments of the present invention aim to reduce or eliminate the above-described problems in electronic trading systems.

In order to protect a trading party from predatory trading strategies employed by some market participants, especially during certain periods when quotes for a particular security are experiencing rapid changes or transitions, embodiments of the present invention facilitate and support a new type of trading orders whose booking and execution behaviors are dynamically varied in response to environmental market conditions. Pursuant to predefined rules for the new type of trading orders, the orders may be allowed to trade at more aggressive price levels if the market is relatively stable, and the orders can only trade at less aggressive price levels when the market is unstable.

Dedicated hardware and/or software components of an electronic trading platform may screen incoming orders to identify those that qualify for exercising price discretion. Environmental market conditions, such as price movements at other trading venues, are monitored and used as a basis for varying or limiting price discretion for the qualified orders during booking and/or execution.

BRIEF DESCRIPTION OF THE DRAWINGS

Various embodiments of the present invention taught herein are illustrated by way of example, and not by way of limitation, in the figures of the accompanying drawings, in which:

FIGS. 1A, 1B, 2, 2A, 2B, 3, 4, 5A, and 5B show hypothetical examples 1A, 1B, 2, 2A, 2B, 3, 4, 5A, and 5B, respectively, illustrating an exemplary order entry and recheck methodology for dynamic peg orders according to embodiments of the present invention;

DETAILED DESCRIPTION OF THE INVENTION

Figure 6:
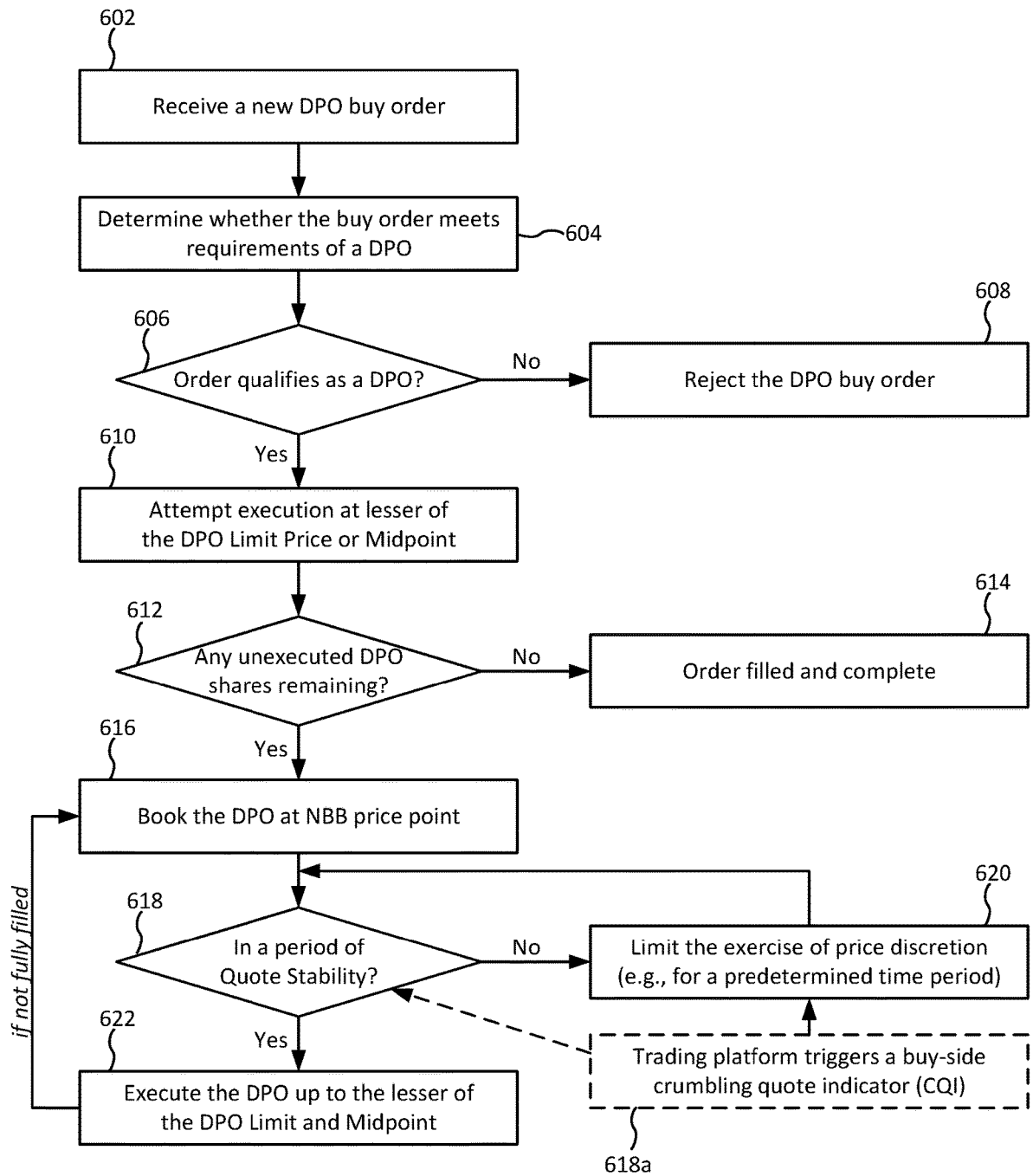
FIG. 6 is a flowchart illustrating an exemplary process and algorithm for processing a DPO buy order according to an embodiment of the present invention.

To further improve the fairness and efficiency of an electronic trading system (such as the TLL/POP facilitated trading platform previously disclosed in PCT International Application No. PCT/US13/59558), embodiments of the present invention introduce a new type of trading orders known as "dynamic peg orders" or "discretionary peg orders" (or DPOs) and related order entry and execution mechanisms. Dynamic peg orders are designed to change their processing and matching behavior in response to environmental market conditions. During certain environmental market conditions (e.g., during a period of quote stability), a DPO may be willing to trade at a more aggressive price; during other environmental market conditions (e.g., during a period of quote instability), the DPO may be willing to trade at a less aggressive price. The dynamically pegged (or booked) price points for a DPO may help protect the party who submitted the order from predatory trading strategies employed by some market participants.

According to some embodiments of the present invention, "dynamic peg orders" (or DPOs) may be limit orders, or unpriced orders, priced automatically as determined by the electronic trading system to be equal to the primary quote (or mid, or market, or other predetermined price point) of the "national best bid and offer price" or NBBO (i.e., "national best bid" or NBB for buy orders, "national best offer" or NBO for sell orders), up (for a bid) or down (for an offer) to the order's limit price (or another predetermined price point). According to certain implementations, a dynamic peg order will execute up/down to the midpoint (or another predetermined price point) against a contra-side order priced at the midpoint (or such other predetermined price point) or better, during a period of "quote stability" as determined by the electronic trading system. More generally, the electronic trading system may impose different booking or execution restrictions on a DPO, for example, by allowing it to execute in a first price range when quotes are unstable and allowing it to execute in a second, more aggressive price range when quotes are stable. According to other embodiments, rather than labeling it as a new order type, the order book entries and trade executions of an exchange may be simply implemented by an electronic trading system based on the above DPO methodology.

The IEX electronic trading system is an exemplary trading system in which the DPOs and related operations may be implemented according to one embodiment of the present invention.

Quote Stability

One example of "environmental market conditions" is a period of "quote stability" which refers to a time period when quotes are stable as the quotations for a symbol or security across many venues are holding steady and not changing. Such a period of "quote stability" may be defined in a number of ways. The restriction related to "quote stability"—that is, requiring either order to be one entered and/or marketable (i.e., priced at an immediately executable price) during a period of "quote stability"—increases the chance that DPOs are executed against contra-side orders at more aggressive prices only during situations when the market is stable, or at less aggressive prices when the quote is not stable, thereby reducing the chance of predatory trading strategies taking advantage of price dislocations during quote instability among the exchanges.

According to one embodiment of the present invention, a period when a quote is "unstable" may be defined as one where:

(# of near side venues)−2×(# of far side venues)>4

Here, for a particular security (e.g., Microsoft common stock MSFT), the "# of near side venues" refers to the total number of markets or trading venues (e.g., the 11 stock exchanges) each of which publishes a quotation on the near side of the DPO in question; "# of far side venues" refers to the total number of markets or venues each of which publishes a quotation on the far side of the DPO in question. The terms "near side" and "far side" are relative to the DPO in question where a far side quotation is on the contra-side of the DPO while the near side quotation is on the same side of the DPO. For example, for a buy DPO, another bid is on its near side at the NBB while an offer is on its far side at the NBO; for a sell DPO, another offer is on its near side at the NBO while a bid is on its far side at the NBB. The pronounced difference between the number of near side and far side quotations is an indication of quote volatility and/or a quote transition underway.

According to another embodiment of the present invention, a period when a quote is "unstable toward the bid" may be defined as one where (# of NBO venues)−2*(# of NBB venues)>4

Here, the "# of NBO venues" refers to the total number of markets or venues each of which publishes the NBO quotation for the subject of the DPO in question; the "# of NBB venues" refer to the total number of markets or venues each of which publishes the NBB quotation for the subject of the DPO in question. It is noted that, while there are currently 12 NBBO venues, any number of them from 1 to all 12 could have a quote at the NBBO, that is, at least one quoting at the NBB and at least one quoting at the NBO (but not necessarily the same venue quoting at both NBB and NBO simultaneously). According to an implementation of the present invention, a DPO might trade less aggressively when the quote is leaning in one specific direction (i.e. unstable while leaning in the direction of the order), or it might trade differently when the quote is unstable in either direction.

It should be noted that the above formulae are exemplary methods of defining a period of "quote instability" given the current number of quoting exchanges or venues. Other methods or criteria of determining or detecting a period of "quote instability" (or conversely, a period of "quote stability") may also be used.

In one embodiment of the present invention, a dynamic peg order is considered "active" when it has just arrived at the exchange or during an order book recheck (such as the recheck process implemented by IEX's trading system). In both instances the DPO is active when it is testing against contra-side orders resting in the order book. In one embodiment of the present invention once the DPO is booked, it is considered "resting" and may be eligible to execute with newly arrived or active contra-side orders or orders that are testing against or being rechecked against the order book.

Active Dynamic Peg Behavior

During order entry of an active DPO, the electronic trading system may test DPO against the order book (and execute the order) up to the order's limit or the midpoint, whichever is less aggressive. If any shares remain, then the DPO may be booked at the primary quote of the corresponding NBB (for a buy DPO) or NBO (for a sell DPO).

During an order book recheck, the DPO may be invited to execute up to the midpoint or the DPO limit price (whichever is less aggressive) assuming it is not a period of "quote instability."

Resting Dynamic Peg Behavior

According to embodiments of the present invention, a resting DPO can rest on the primary quote of NBB (for buy DPO) or NBO (for sell DPO) up to the order's limit. Resting DPOs may execute with active Limit, Market, Midpoint Pegged/Constrained orders and DPOs down/up to the active buy/sell order's limit, assuming it is not a period of "quote instability."

The hypothetical examples shown in FIGS. 1-5 illustrate the order entry and recheck methodology for DPOs. In each of the tables shown in FIGS. 1-4, the first row under the header row shows the national best bid/offer as well as midpoint prices for a hypothetical stock.

In Example 1A (shown in FIG. 1A), the NBB and NBO are 10 and 14 cents per share respectively, and therefore the NBBO midpoint is 12 cents per share. A DPO to buy shares at a limit price of 12 cents per share (same as NBBO midpoint) will be booked at NBB (i.e., 10 cents per share), but this buy DPO will be willing to recheck up to its limit price of 12 cents per share.

According to an alternative embodiment of the present invention, how the DPO is booked may depend on the environmental market conditions. For example, during a period of "quote stability," the DPO to buy shares at a limit price of 12 cents per share may be booked at the NBBO midpoint of 12 cents per share; during a period of "quote instability," this buy DPO may "back off" to the NBB of 10 cents per share.

Similarly, with the same NBBO price points, a DPO to sell shares at a limit price of 12 cents per share (same as NBBO midpoint) will be booked at NBO (i.e., 14 cents per share), but this sell DPO will be willing to recheck down to its limit price of 12 cents per share. This is illustrated in Example 1B (shown in FIG. 1B). According to an alternative embodiment, during a period of "quote stability," the DPO to sell shares at a limit price of 12 cents per share may be booked at the NBBO midpoint of 12 cents per share; during a period of "quote instability," this sell DPO may "back off" to the NBO of 12 cents per share.

In Example 2 (shown in FIG. 2), the NBB and NBO are again 10 and 14 cents per share respectively, and therefore the NBBO midpoint is 12 cents per share. A DPO to buy shares at a limit price of 11 cents per share (less aggressive than NBBO midpoint) will be booked at NBB (i.e., 10 cents per share), but this buy DPO will be willing to recheck up to its limit price of 11 cents per share. Similarly, a DPO to sell shares at a limit price of 13 cents per share (also less aggressive than NBBO midpoint) will be booked at NBO (i.e., 14 cents per share), but this sell DPO will be willing to recheck down to its limit price of 13 cents per share.

If, as shown in Example 2A (FIG. 2A), the NBO subsequently drops from 14 to 12 cents per share, causing the NBBO midpoint to drop from 12 to 11 cents per share, then the sell DPO (at 13 cents) should be booked at its limit price of 13 cents per share and willing to recheck to the same price point because it has now become less aggressive than the NBO. The book entry and rechecking for the buy DPO (at 11 cents) remain the same. The buy DPO book entry (at 10 cents per share) remains the same but will now be willing to recheck up to 11 cents.

If, as shown in Example 2B (FIG. 2A), the NBB rises from 10 to 12 cents per share, causing the NBBO midpoint to rises from 12 to 13 cents per share, then the buy DPO (at 11 cents) should be booked at its limit price of 11 cents per share and willing to recheck to the same price point because it has now become less aggressive than the NBB. The sell DPO book entry (at 14 cents per share) remains the same but will now be willing to recheck down to 13 cents.

In Example 3 (FIG. 3), the NBB and NBO are again 10 and 14 cents per share respectively, and therefore the NBBO midpoint is 12 cents per share. A DPO to buy shares at a limit price of 13 cents per share (more aggressive than NBBO midpoint) will be booked at NBB (i.e., 10 cents per share), but this buy DPO will be permitted to recheck up to the NBBO midpoint of 12 cents per share. Similarly, a DPO to sell shares at a limit price of 11 cents per share (also more aggressive than NBBO midpoint) will be booked at NBO (i.e., 14 cents per share), but this sell DPO will be permitted to recheck down to the NBBO midpoint of 12 cents per share.

For comparison purpose, exemplary behavior of midpoint peg orders (MPOs) are shown in Example 4 (FIG. 4) while the NBB and NBO are 10 and 14 cents per share respectively and therefore the NBBO midpoint is 12 cents per share. MPOs are booked, and executable at, the NBBO midpoint regardless of quote stability/instability.

Examples 5A and 5B (shown in FIGS. 5A-5B) illustrate another benefit of the DPO methodology described above, namely the DPO rule which seeks to prevent execution at more aggressive prices with orders entered or that became marketable during a period of "quote instability." As shown in Example 5A (FIG. 5A), a hypothetical security is traded on Markets 1-5 which all started with the NBB and NBO at 10 and 14 cents per share respectively (therefore the NBBO midpoint is at 12 cents per share). If some of the markets (Markets 1-3) experience a change in the NBO from 14 to 15 cents per share (commencing a period of quote instability), the NBBO midpoint is anticipated to rise from 12 to 12.5 cents per share. Before the quotes on other markets (Markets 4 and 5) transition, predatory strategies could race to those markets and successfully execute orders at the potentially soon to be outdated midpoint of 12 cents per share. In contrast, the quote instability period could be detected by the electronic trading system according to embodiments of the present invention which could halt the execution of DPOs against orders at potentially soon to be outdated midpoints (i.e. more aggressive prices) entered during the quote transition period, thereby defeating a predatory strategy's attempt at order book arbitrage. However, DPOs may still be permitted to execute at less aggressive prices, for example at the NBB or NBO during the period of quote instability.

Computer-Implementation

The components used to implement embodiments of the present invention may be or include a computer or multiple computers. The components may be described in the general context of computer-executable instructions, such as program modules, being executed by a computer. Generally, program modules include routines, programs, objects, components, data structures, etc. that performs particular tasks or implement particular abstract data types.

Those skilled in the art will appreciate that the invention may be practiced with various computer system configurations, including hand-held wireless devices such as mobile phones or PDAs, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

The computer system may include a general purpose computing device in the form of a computer including a processing unit, a system memory, and a system bus that couples various system components including the system memory to the processing unit.

Computers typically include a variety of computer readable media that can form part of the system memory and be read by the processing unit. By way of example, and not limitation, computer readable media may comprise computer storage media and communication media. The system memory may include computer storage media in the form of volatile and/or non-volatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by processing unit. The data or program modules may include an operating system, application programs, other program modules, and program data. The operating system may be or include a variety of operating systems such as Microsoft Windows® operating system, the Unix operating system, the Linux operating system, the Xenix operating system, the IBM AIX™ operating system, the Hewlett Packard UX™ operating system, the Novell Netware™ operating system, the Sun Microsystems Solaris™ operating system, the OS/2™ operating system, the BeOS™ operating system, the Macintosh™ operating system, the Apache™ operating system, an OpenStep™ operating system or another operating system of platform.

At a minimum, the memory includes at least one set of instructions that is either permanently or temporarily stored. The processor executes the instructions that are stored in order to process data. The set of instructions may include various instructions that perform a particular task or tasks, such as those shown in the appended flowcharts. Such a set of instructions for performing a particular task may be characterized as a program, software program, software, engine, module, component, mechanism, or tool. A plurality of software processing modules may be stored in a memory as described above and executed on a processor in the manner described herein. The program modules may be in the form of any suitable programming language, which is converted to machine language or object code to allow the processor or processors to read the instructions. That is, written lines of programming code or source code, in a particular programming language, may be converted to machine language using a compiler, assembler, or interpreter. The machine language may be binary coded machine instructions specific to a particular computer.

Any suitable programming language may be used in accordance with the various embodiments of the invention. Illustratively, the programming language used may include assembly language, Ada, APL, Basic, C, C++, COBOL, dBase, Forth, FORTRAN, Java, Modula-2, Pascal, Prolog, REXX, and/or JavaScript for example. Further, it is not necessary that a single type of instruction or programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module.

The computing environment may also include other removable/nonremovable, volatile/non-volatile computer storage media. For example, a hard disk drive may read or write to non-removable, non-volatile magnetic media. A magnetic disk drive may read from or writes to a removable, non-volatile magnetic disk, and an optical disk drive may read from or write to a removable, non-volatile optical disk such as a CD ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

The processing unit that executes commands and instructions may be a general purpose computer, but may utilize any of a wide variety of other technologies including a special purpose computer, a microcomputer, mini-computer, mainframe computer, programmed microprocessor, microcontroller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID processor, smart chip, or any other device or arrangement of devices that is capable of implementing the steps of the processes of the invention.

It should be appreciated that the processors and/or memories of the computer system need not be physically in the same location. Each of the processors and each of the memories used by the computer system may be in geographically distinct locations and be connected so as to communicate with each other in any suitable manner. Additionally, it is appreciated that each of the processor and/or memory may be composed of different physical pieces of equipment.

A user may enter commands and information into the computer through a user interface that includes input devices such as a keyboard and pointing device, commonly referred to as a mouse, trackball or touch pad. Other input devices may include a microphone, joystick, game pad, satellite dish, scanner, voice recognition device, keyboard, touch screen, toggle switch, pushbutton, or the like. These and other input devices are often connected to the processing unit through a user input interface that is coupled to the system bus, but may be connected by other interface and bus structures, such as a parallel port, game port or a universal serial bus (USB).

One or more monitors or display devices may also be connected to the system bus via an interface. In addition to display devices, computers may also include other peripheral output devices, which may be connected through an output peripheral interface. The computers implementing the invention may operate in a networked environment using logical connections to one or more remote computers, the remote computers typically including many or all of the elements described above.

Various networks may be implemented in accordance with embodiments of the invention, including a wired or wireless local area network (LAN) and a wide area network (WAN), wireless personal area network (PAN) and other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism. Computers may be connected over the Internet, an Intranet, Extranet, Ethernet, or any other system that provides communications. Some suitable communications protocols may include TCP/IP, UDP, or OSI for example. For wireless communications, communications protocols may include Bluetooth, Zigbee, IrDa or other suitable protocol. Furthermore, components of the system may communicate through a combination of wired or wireless paths.

Although many other internal components of the computer are not shown or described here, those of ordinary skill in the art will appreciate that such components and the interconnections are well known. Accordingly, additional details concerning the internal construction of the computer need not be disclosed in connection with the present invention.

In operation, a computer processor or the like in an electronic trading system may be configured with a special set of program instructions to recognize a dynamic peg order (DPO) and automatically perform the order entry, order book recheck, and trade execution functions consistent with the methodology described above.

Figure 8:
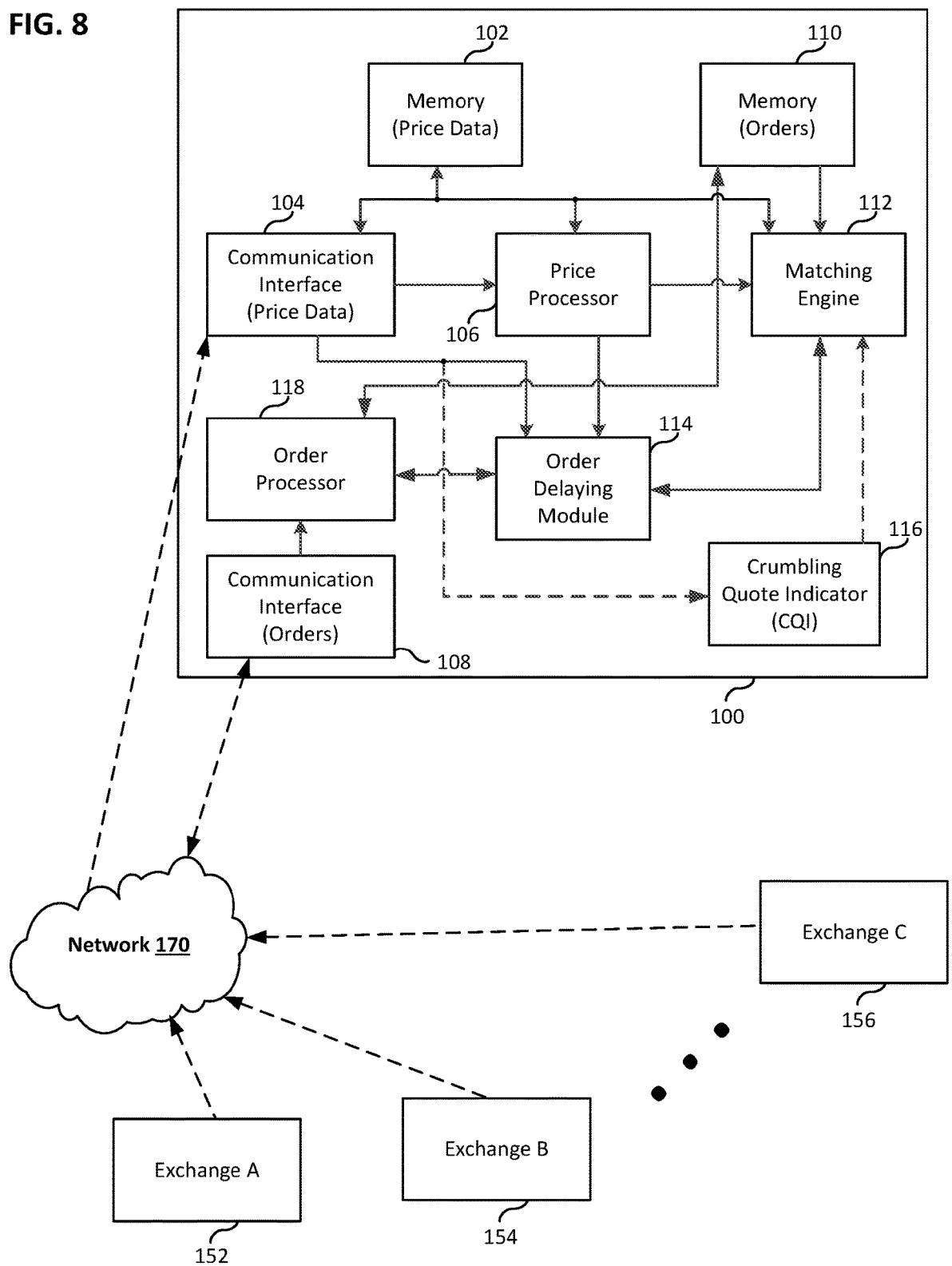
FIG. 8 schematically depicts an electronic trading platform implementing dynamic peg orders according to one embodiment, and a typical operating environment of such a platform.

More specifically, FIG. 8 shows a block diagram of an exemplary electronic trading platform 100 implementing dynamic peg orders according to one embodiment and a typical operating environment of such a platform.

The platform 100 allows various market participants to perform transactions relating to one or more items of interest. In some embodiments, the item of interest may be a security (e.g., a stock or a bond). In other embodiments, the item of interest may be an event ticket, a ticket for a service, and/or an article for sale. While the description below generally considers a security as the item of interest, this is only for the sake of convenience. The techniques described herein are applicable to various different types of items of interest identified above.

Typically for a security, at a particular instant of time the platform 100 has a price associated with that security. That price may be stored in a memory module 102. Events, such as trading events associated with the security, can occur at one or more venues such as Exchange A (152), Exchange B (154), and Exchange C (156), which can be trading exchanges, electronic communication networks (ECNs) registered as broker-dealers, alternative trading systems (ATSs) approved by a regulatory agency such as the U.S. Securities and Exchange Commission, private exchanges or forums for trading securities, generally known as dark pools, and/or alternative display facilities (ADF). The number of venues can be any number, e.g., 1, 2, 5, 6, 11, 15, etc. One or more of the events can affect the price of the security. Therefore, the platform 100 may receive data updates about such events from the one or more sources 162, 164, 166 through a network 170 (e.g., the Internet, a proprietary network, etc.), so that the platform can update the price of the security using the received event data. Data from different sources/venues may be received through different networks and/or networks of different types. Typically, the events continue to occur as time progresses and, hence, the event data may be received by the platform 100, via a communication interface 104, on an on-going basis.

After price data for a security (an item of interest, in general) is received from a source, that data is typically used to update a price of the security, such as in an order book maintained by the platform 100. To this end, the communication interface may store the price data in the memory module 102 and/or may forward that data to a price processor 106. In some embodiments, the price processor 106 can access the received data from the memory module 102. In various embodiments, the price processor computes an updated price for the security using the received price data, and may store the updated price in the memory module 102.

In different embodiments, the price processors 106 may have different architectures. For example, the price processor 106 may include a single processor or may include several processors performing price-updating computations in sequence and/or in parallel. One or more processors can be general purpose processors and/or specialized processors such as math co-processors. In some embodiments, one or more processors may include application specific integrated circuits (ASICs) and/or field programmable gate arrays (FPGAs). The price processor 106 may be implemented using hardware processors only, using hardware processors having embedded software, or using processors executing software instructions accessed from memory.

The platform 100 may also include a communication interface 108 for trading orders or transaction requests in general to be received from and/or routed to market participants and/or other venues. An order processor 118 may process the incoming trading orders or transaction requests, for example, by screening and sorting them into different order types. For instance, the order processor 118 may examine new orders to determine whether their content and format meet certain requirements and whether they qualify as dynamic peg orders or other types. With or without being processed by the order processor 118, the trading orders or transaction requests may be stored in a memory module 110.

In general, a matching engine 112, implemented using one or more processors and/or software, matches a transaction request received from one participant with one or more transaction requests that were previously received from one or more other participants. Such previously received transaction requests may be called orders resting on the order book or resting orders, and may be stored in the memory module 110. An order resting on the order book may rely on the platform 100 to provide the up-to-date price of a security and, as such, if an order based on the most up-to-date price is received from a high-speed trader before the platform has computed the most up-to-date price, the matching engine 112 may match the order using stale price information, giving the high-speed trader an undue advantage.

To prevent matching a transaction request based on the latest security-related information with a transaction request based on a stale price of the security, or to minimize the risk of permitting such an unfair match, the platform 100 may employ an order delaying module 114 that delays the transaction requests received by the communication interface 108 before they are forwarded to the matching engine 112 for matching. The forwarding delay may be introduced using a buffer implemented in hardware and/or software. The introduced forwarding delay is related to the communication delay and the processing delay that is determined or obtained by the platform 100.

By introducing this forwarding delay, the platform 100 can ensure, or at least increase the likelihood, that the price processor 106 has determined the true, up-to-date price of a security based on the latest information/data about the security, so that the matching engine 112 has knowledge of the up-to-date price when it attempts to match transaction requests. By delaying the requests, the platform 100 can make the up-to-date price of securities (items of interest, in general) available to all participants prior to matching their transaction requests, thereby reducing the likelihood that certain participant(s) can take an undue advantage of other participants.

Furthermore, to implement dynamic peg orders in accordance with embodiments described herein, a crumbling quote indicator module 116 may receive price data from other exchanges via the communication interface 104 and determine, based on the price data and a predetermined algorithm, whether a security is experiencing a period of quote instability. The result of the determination, such as a CQI signal, may be fed from the crumbling quote indicator module 116 to the matching engine 112 to vary the execution and order-book rechecking behaviour of DPOs.

Exemplary Rules Governing Dynamic Peg Orders

According to a particular embodiment of the present invention, a dynamic peg order or discretionary peg order may be defined and regulated in an electronic trading system with a detailed set of rules. For example, it may be specified that, upon entry, a DPO for a particular symbol or security is priced automatically by the trading system to be equal to the less aggressive price point of a Midpoint Price or the DPO's Limit Price (if any). Any unexecuted shares of such order are posted to the Order Book, priced to be equal to the primary quote or the order's Limit Price, and is automatically adjusted by the trading system in response to changes in the NBB (NBO) for buy (sell) orders up (down) to the order's Limit Price (if any). In order to meet the Limit Price of Active Orders on the Order Book, a DPO is allowed to exercise the least amount of price discretion necessary from the DPO's resting price on the NBBO to the less aggressive of the Midpoint Price or the DPO's Limit Price. While exercising price discretion, DPOs may be assigned a new timestamp at the discretionary price such that the time priority of the DPOs at the discretionary price can be determined with respect to other orders at that price point. After exercising price discretion, the DPOs may maintain their priority at their resting price.

More specific requirements for a DPO may include:
(A) Must be a Pegged Order.
(B) Must have a "Time In Force" (TIF) of "Market Hours Day" (DAY), "Good Till Time" (GTT), "Good Till Crossing" (GTX), System Hours (SYS) inclusive of pre-, post-, and primary session trading, "Fill or Kill" (FOK) or "Immediate or Cancel" (IOC), as described in Rule 11.190(c) of IEX Group's "Investors' Exchange Rule Book" available on the website of U.S. Securities and Exchange Commission (SEC).
(C) Must be IEX Only.
(D) May not be an Inter-market Sweep Order.
(E) May be submitted with a Limit Price or as an unpriced order.
(F) Are eligible to trade only during the Regular Market Session. As provided in Rule 11.190(a)(3)(D) of IEX Group's "Investors' Exchange Rule Book," any Pegged Order, which is marked DAY, submitted to the trading system before the opening of Regular Market Session will be queued by the trading system until the start of Regular Market Session; any Pegged Order, which is marked with a TIF other than DAY will be rejected when submitted to the trading system during the Pre-Market Session. Any Pegged Order submitted into the trading system after the closing of Regular Market Session will be rejected.
(G) May be a Minimum Quantity Order.
(H) May be an odd lot, round lot, or mixed lot.
(I) Eligible to be invited by the trading system to Recheck the Order Book to trade against interest resting at the Midpoint Price as described in Rule 11.230(a)(1) of IEX Group's "Investors' Exchange Rule Book."
(J) Eligible to exercise price discretion up to the discretionary price, except during periods of quote instability, as specified in paragraph (K) below.
(K) Quote stability is a measure of whether the exchange or market center believes the NBB (NBO) for a particular security is in the process of changing as indicated by its assessment of relative quoting activity of Protected Quotations at the current NBBO over a period of time.
  (i) Quote instability may be determined by the trading system based on the following factors:
    (a) The NBB and NBO are the same as the NBB and NBO one (1) millisecond ago; and
    (b) The NBBO spread must be less than or equal to the thirty (30) day median NBBO spread during the Regular Market Session; and
    (c) There are more Protected Quotations on the far side; i.e. more quotes on the NBO than the NBB for buy orders, or more quotes on the NBB than the NBO for sell orders; and
    (d) The quote instability factor is greater than the quote instability threshold, as defined below.
    (e) Quote Instability Coefficients. The exchange or market center utilizes the Quote Instability Coefficients below:
      $C_0 = -2.39515$
      $C_1 = -0.76504$
      $C_2 = 0.07599$
      $C_3 = 0.38374$
      $C_4 = 0.14466$
    (f) Quote Instability Variables. The exchange or market center utilizes the Quote Instability Variables defined below to calculate the current quote instability factor.
      N. Number of Protected Quotations on the near side of the market, i.e. NBB for buy orders and NBO for sell orders.
      F. Number of Protected Quotations on the far side of the market, i.e. NBO for buy orders and NBB for sell orders.
      $N_{-1}$. Number of Protected Quotations on the near side of the market one (1) millisecond ago.
      $F_{-1}$. Number of Protected Quotations on the far side of the market one (1) millisecond ago.
    (g) Quote Instability Threshold. The exchange or market center utilizes a Quote Instability Threshold of 0.32.
    (h) Quote Instability Factor. A proprietary method for calculating quote instability as defined by the following formula:

$$\frac{1}{1+e^{-(C_0+C_1 N+C_2 F+C_3 N_{-1}+C_4 F_{-1})}}$$

(ii) If the trading system determines the NBB for a particular security to be unstable in accordance with foregoing paragraph (i), it will trigger a crumbling quote indicator ("CQI") that restricts Buy DPOs in that security from exercising price discretion to trade against interest above the NBB up to and including the Midpoint Price. If the trading system determines the NBO for a particular security to be unstable in accordance with foregoing paragraph (i), it will trigger a CQI that restricts Sell DPOs in that security from exercising price discretion to trade against interest below the NBO down to and including the Midpoint Price.

(iii) CQI will remain in effect at that price level for ten (10) milliseconds.
(iv) The trading system will only trigger a CQI on one side of the market at a time in a particular security.
(v) The exchange or market center may modify the Quote Instability Coefficients and Quote Instability Threshold from time to time.

Exemplary Processes/Algorithms for DPO Buy/Sell Orders

Referring to FIG. 6, there is shown a flowchart illustrating an exemplary process and algorithm for processing a DPO buy order according to an embodiment of the present invention.

In Step 602, a new DPO buy order may be received by an electronic trading platform such as the one illustrated in FIG. 8. The new order may be a request to buy a certain amount of a specified security (e.g., common stock) typically at a specified price point (i.e., Limit Price). For example, the order may be a request to buy 500 shares of Intel Corporation's common stock (ticker INTC) at a Limit Price of $29 per share. The new order may further specify an order type of "DPO" ("dynamic peg order" or "discretionary peg order") or simply requests price discretion based on environmental market conditions.

In Step 604, the electronic trading platform (or its order processor or the like) may determine whether the buy order meets the requirements of a DPO. For example, the platform may parse the order parameters and automatically perform a compliance check against preset DPO rules. If it is decided in Step 606 that the buy order does not qualify as a DPO, then the DPO buy order may be rejected by the platform in Step 608.

If the buy order qualifies as a DPO, then the platform may attempt to execute the DPO buy order in Step 610 against corresponding sell orders available on the order book. The matching engine may try to execute the buy order, for as many shares as possible, at a price point that is the lesser of the DPO Limit Price or the current Midpoint Price. If, after this initial execution (Step 610), there are no unexecuted DPO shares remaining in Step 612, then the DPO buy order is recorded as filled and complete in Step 614. Any remaining, unexecuted DPO shares may be booked in Step 616 at the NBB price point.

In Step 618, it may be determined whether the security of interest is in a period of quote stability. This may be achieved by the trading platform monitoring the price movements of the security on the order books of a number of venues or exchanges and triggering a buy-side crumbling quote indicator (CQI) in Step 618a when the price data of that security meet predefined conditions.

If the security price is experiencing instability among the venues or exchanges (i.e., not in a period of quote stability), then the exercise of price discretion by the booked DPO buy order may be limited in Step 620. For example, a buy-side CQI indicating instabilities may remain in force for a predetermined period of time (e.g., a few milliseconds), causing the restriction of price discretion to continue for the same period of time.

When it is confirmed that the security price is in a period of quote stability (e.g., in the absence of a triggered buy-side CQI), the DPO buy order may be executed in Step 622 up to the lesser of the DPO Limit Price or Midpoint Price. As a result, the buy DPO order is allowed two modes of price discretion: in a first mode, the price discretion is limited since the quotes are unstable or unsteady; in a second mode, the price discretion is less restricted since the quotes are more stable.

Figure 7:
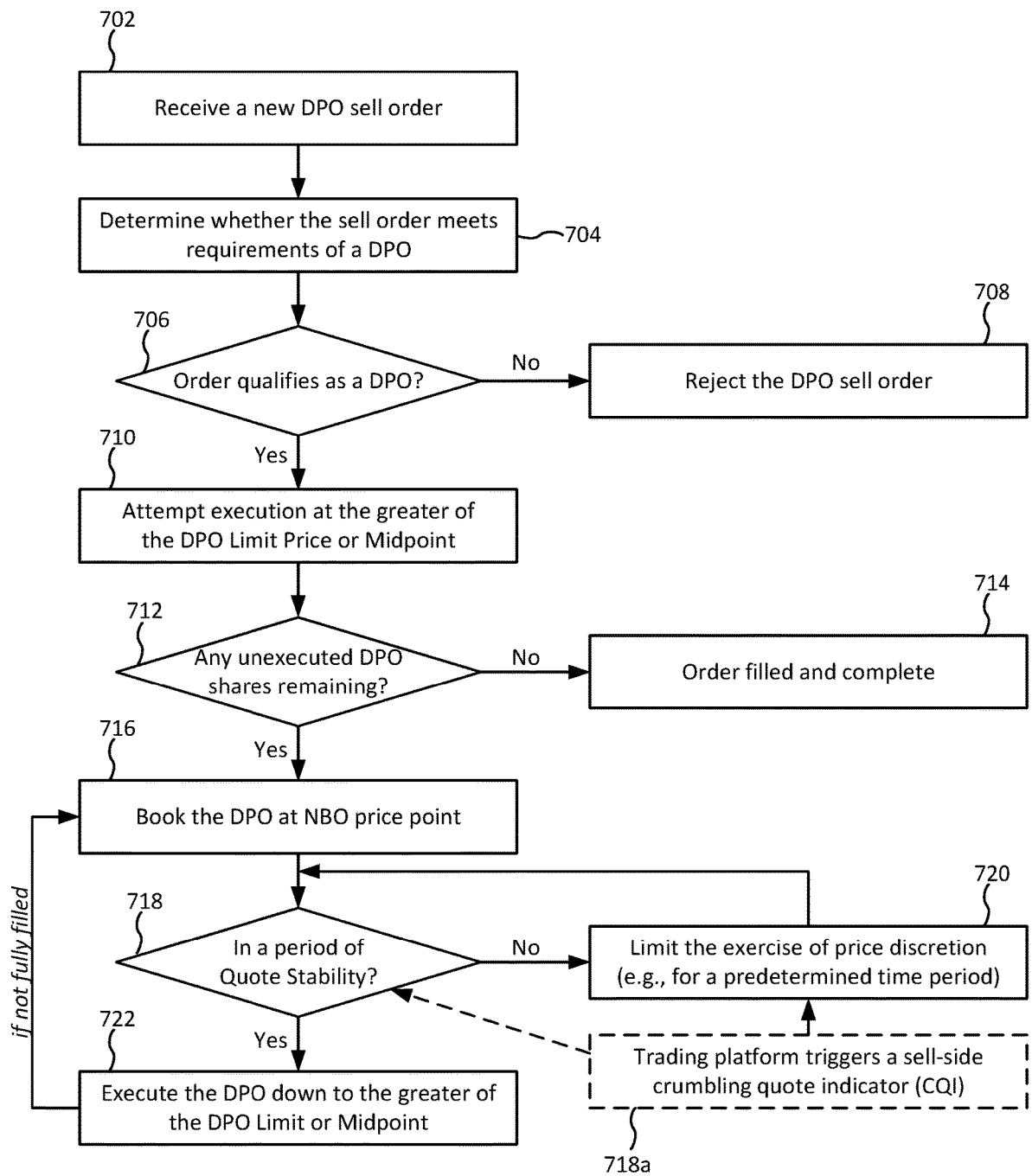
FIG. 7 is a flowchart illustrating an exemplary process and algorithm for processing a DPO sell order according to an embodiment of the present invention.

FIG. 7 is a flowchart illustrating an exemplary process and algorithm for processing a DPO sell order according to an embodiment of the present invention. The process/algorithm shown in FIG. 7 is similar to the one shown in FIG. 6, except that the parameter ranges are modified for the sell order in Steps 710 and 722.

While the foregoing description includes many details and specificities, it is to be understood that these have been included for purposes of explanation only, and are not to be interpreted as limitations of the present invention. It will be apparent to those skilled in the art that other modifications to the embodiments described above can be made without departing from the spirit and scope of the invention. Accordingly, such modifications are considered within the scope of the invention as intended to be encompassed by the patent claims ultimately issued from this application.

The invention claimed is:

1. An apparatus for facilitating dynamic peg orders in an electronic trading system, the apparatus comprising:
   a first communication interface configured to receive a trading order concerning an item of interest;
   a second communication interface configured to receive price data of said item of interest from at least one other electronic trading system;
   a matching engine, operatively coupled to the first and second communication interfaces, configured to vary price discretion of said trading order based on the received price data, wherein:
      the matching engine restricts execution of said trading order to a first pricing range when the received price data indicate an instability in quotes for said item of interest, and
      the matching engine permits execution of said trading order in a second pricing range when the received price data indicate a stability in quotes for said item of interest, said second pricing range being more aggressive than said first pricing range,
   an order delay component, operatively coupled to at least the first communication interface and/or said matching engine, configured to impose an additional latency on an arrival or processing of data signals containing incoming trading orders at the matching engine, such that said trading order concerning said item of interest is not processed by the matching engine before the matching engine has had sufficient time to receive and process an update of said price data of said item of interest, issued prior to issuance of said trading order, from said at least one other electronic trading system.

2. The apparatus of claim 1, being further configured to:
   examine said trading order to determine whether it meets predetermined requirements of a dynamic peg order (DPO).

3. The apparatus of claim 1, being further configured to:
   calculate a crumbling quote indicator (CQI) value based on a predetermined algorithm and the received price data.

4. The apparatus of claim 1, being further configured to:
   issue a trigger signal to indicate to the matching engine said instability or said stability in the quotes for said item of interest.

5. The apparatus of claim 4, being further configured to:
   maintain said trigger signal for a predetermined period of time after issuing said trigger signal.

6. The apparatus of claim 1, being further configured to book said trading order at:
the greater of a national best offer (NBO) price or said trading order's limit price, if said trading order is a sell order; or
the lesser of a national best bid (NBB) price or said trading order's limit price, if said trading order is a buy order.

7. The apparatus of claim 1, wherein the first pricing range is bound at one end by:
a national best offer (NBO) price, if said trading order is a sell order with a limit price lower than the NBO; or
a national best bid (NBB) price, if said trading order is a buy order with a limit price higher than the NBB.

8. The apparatus of claim 1, wherein the second pricing range is bound at one end by:
the greater of a national best bid and offer (NBBO) midpoint price or said trading order's limit price, if said trading order is a sell order; or
the lesser of a national best bid and offer (NBBO) midpoint price or said trading order's limit price, if said trading order is a buy order.

9. The apparatus of claim 1, wherein said additional latency is imposed on the transmission of said data signals by routing said data signals through a physical medium of chosen physical parameters.

10. A method for facilitating dynamic peg orders in an electronic trading system, the method comprising:
receiving, by a first communication interface, a trading order concerning an item of interest;
receiving, by a second communication interface, price data of said item of interest from at least one other electronic trading system;
varying, by a matching engine operatively coupled to the first and second communication interfaces, price discretion of said trading order based on the received price data, the step of varying the price discretion further comprising:
restricting, by the matching engine, execution of said trading order to a first pricing range when the received price data indicate an instability in quotes for said item of interest, and
permitting, by the matching engine, execution of said trading order in a second pricing range when the received price data indicate a stability in quotes for said item of interest, said second pricing range being more aggressive than said first pricing range; and
imposing, by an order delay component operatively coupled to at least the first communication interface and/or said matching engine, an additional latency on an arrival or processing of data signals containing incoming trading orders at said matching engine, such that said trading order concerning said item of interest is not processed by the matching engine before the matching engine has had sufficient time to receive and process an update of said price data of said item of interest, issued prior to issuance of said trading order, from said at least one other electronic trading system.

11. The method of claim 10, further comprising:
calculating a crumbling quote indicator (CQI) value based on a predetermined algorithm and the received price data.

12. The method of claim 10, further comprising:
issuing a trigger signal to indicate to the matching engine said instability or said stability in the quotes for said item of interest.

13. The method of claim 10, wherein said additional latency is of a predetermined, fixed amount.

14. The method of claim 10, wherein said additional latency is imposed by routing said data signals through a physical cable of dimensions chosen to achieve a desired amount of said additional latency.

15. A system for facilitating dynamic peg orders in an electronic trading system, the system comprising:
a first communication interface configured to receive a trading order concerning an item of interest;
a second communication interface configured to receive price data of said item of interest from at least one other electronic trading system;
a matching engine, operatively coupled to the first and second communication interfaces, configured to vary price discretion of said trading order based on the received price data, wherein:
the matching engine imposes an additional latency on an arrival or processing of said data signals containing the incoming trading orders, such that said trading order concerning said item of interest is not processed by the matching engine before the matching engine has had sufficient time to receive and process an update of said price data of said item of interest, issued prior to issuance of said trading order, from said at least one other electronic trading system,
the matching engine restricts execution of said trading order to a first pricing range when the received price data indicate an instability in quotes for said item of interest, and
the matching engine permits execution of said trading order in a second pricing range when the received price data indicate a stability in quotes for said item of interest, said second pricing range being more aggressive than said first pricing range.

16. The system of claim 15, being further configured to:
calculate a crumbling quote indicator (CQI) value based on a predetermined algorithm and the received price data.

17. The system of claim 15, being further configured to:
issue a trigger signal to indicate to the matching engine said instability or said stability in the quotes for said item of interest.

18. The system of claim 15, wherein said additional latency is of a predetermined, fixed amount.

19. The system of claim 15, wherein said additional latency is of a variable amount adjustable by said matching engine.

20. The system of claim 15, wherein said additional latency is imposed by routing said data signals through a transmission medium.

21. The system of claim 20, wherein said transmission medium comprises a physical cable of dimensions chosen to achieve a desired amount of said additional latency.

22. The system of claim 21, wherein said physical cable is a coiled fiber-optic cable of a selected length.

* * * * *